United States Patent
Bourbeau

[19]

[11] Patent Number: 5,981,099
[45] Date of Patent: Nov. 9, 1999

[54] PRESSURE RELIEF VALVE FOR ELECTRIC STORAGE BATTERIES

[75] Inventor: Robert D. Bourbeau, Statesville, N.C.

[73] Assignee: Accuma Corporation, Statesville, N.C.

[21] Appl. No.: 09/009,115

[22] Filed: Jan. 20, 1998

[51] Int. Cl.$^6$ ........................................ H01M 2/12
[52] U.S. Cl. ........................ 429/53; 429/54; 429/82
[58] Field of Search .............................. 429/53, 54, 55, 429/56, 57, 82, 87, 89, 71, 72, 180

[56] References Cited

U.S. PATENT DOCUMENTS

| | | |
|---|---|---|
| 3,170,325 | 2/1965 | Sinclair . |
| 3,253,963 | 5/1966 | Sabatino . |
| 3,388,007 | 6/1968 | Fiandt . |
| 3,664,878 | 5/1972 | Amthor . |
| 3,861,965 | 1/1975 | O'Sullivan . |
| 3,909,302 | 9/1975 | Mermelstein . |
| 3,994,749 | 11/1976 | Decket et al. . |
| 4,002,495 | 1/1977 | Hakarine ........................... 136/177 |
| 4,075,399 | 2/1978 | Sabatino et al. . |
| 4,168,350 | 9/1979 | Oxenreider et al. .................. 429/87 |
| 4,186,247 | 1/1980 | Mocas .................................. 429/88 |
| 4,271,241 | 6/1981 | Hooke et al. . |
| 4,286,028 | 8/1981 | Heiser et al. . |
| 4,298,662 | 11/1981 | Sugalski et al. . |
| 4,306,002 | 12/1981 | Heiser et al. . |
| 4,517,262 | 5/1985 | Beidler . |
| 4,780,378 | 10/1988 | McCartney, Jr. et al. . |
| 5,004,655 | 4/1991 | Symanski . |
| 5,217,823 | 6/1993 | Geibl et al. . |
| 5,258,243 | 11/1993 | Cannone . |

OTHER PUBLICATIONS

F.J. Vaccaro, J. Rhoades, K. Marion, R. Malley & M. Sirard of Power Battery Company; Valves for Immoblilized Electrolyte Lead–Acid Batteries Requirements, Design, and Performance; Publication Dates was Prior to the Date This Application Was Filed; All pages; No Volume–Issue No; Power Battery Company, Inc.; U.S.A.

Primary Examiner—Maria Nuzzolillo
Assistant Examiner—Monique M. Wills
Attorney, Agent, or Firm—Adams Law Firm, P.A.

[57] ABSTRACT

A valve for an electric storage battery, including a cap housing for being positioned in an access port in the battery, the cap housing having interior side walls defining a gas-flow orifice therethrough. A valve member is positioned in the gas-flow orifice of the cap housing, and comprises a valve body, including at least one vent defining a gas-flow passage from an upstream to a downstream side of the valve body, a resilient, radially-outwardly extending annular skirt positioned on the downstream side of the valve body in gas-flow communication with the vent, the skirt extending radially outwardly from the valve body in the downstream direction. The skirt has an outermost free end normally sealingly engaging the side walls of the cap housing defining the gas-flow orifice. The annular skirt and adjacent side walls of the cap housing define therebetween an annular recess in gas-flow communication with the vent. The recess progressively narrows in the downstream direction to a terminus at the outermost free end of the skirt. The skirt is adapted to be resiliently responsive to internal gas pressure in the recess acting on the skirt to disengage the side walls of the cap housing by radial, inward movement at a predetermined gas pressure in the battery to provide a gap between the free end of the skirt and the side walls of the cap housing for passing gas past the valve member and into the atmosphere.

23 Claims, 5 Drawing Sheets

PRESSURE RELIEF VALVE FOR ELECTRIC STORAGE BATTERIES

TECHNICAL FIELD AND BACKGROUND OF THE INVENTION

This invention relates to a valve for valve-regulated electric storage batteries and a battery including a valve for regulating pressure within the battery. The invention has particular application in sealed batteries utilized in vehicles and as communication stand-by power systems. These types of batteries normally include some type of relief/check valve for venting hydrogen gas generated within the battery when the internal pressure of the gas within the battery exceeds a predetermined superatmospheric level. Ideally, such valves should vent gas frequently under very low pressure differential conditions, instead of infrequently venting large quantities of gas under high pressure differential conditions. The invention has application in batteries of the type having accessible access openings in the battery top as well as various types of batteries which are non-serviceable and which merely have a pressure regulating valve positioned into the battery top, but without removable battery caps or the like.

Such an ideal operation would require less robust battery cases, since pressure inside the case would be more constant and at a lower pressure. Therefore, the case could be made with less material, making it lighter and permitting correspondingly more lead to be added to the battery.

Such an ideal operation would also prevent ejection of water from the battery along with the vented hydrogen gas. This is a serious problem with long-life batteries, since a decrease in water in the battery reduces the power output and longevity of the battery.

Prior art battery valves include so-called "mushroom" or "burp" valves. These valves operate at relatively high pressure differentials. Another prior art valve type is the "cup" valve. This type of valve generally neither seals nor vents well, because tolerances between contacting parts must be very close.

Since venting in prior art valves takes place at relatively high pressure differentials, the gas is ejected from the battery with such force that it can carry droplets of water out of the battery through the vent along with the gas. In addition, the time taken for prior art valves to reseal is often excessive.

The valve according to this application achieves efficient gas venting under extremely low pressure differentials. The valve may be used in batteries where no pressure differential normally exists, or even where pressure inside the battery is lower than outside pressure.

To achieve this, the valve and the seal are in a single unit, as described and claimed below.

SUMMARY OF THE INVENTION

Therefore, it is an object of the invention to provide a valve for valve-regulated electric storage batteries wherein the valve and seal are in a single unit.

It is another object of the invention to provide a valve for valve-regulated electric storage batteries wherein the valve efficiently ejects gas from the battery at a relatively low pressure differential while preventing the ejection of liquid from the battery along with the gas.

It is another object of the invention to provide a valve for valve-regulated electric storage batteries wherein the battery is operable at conditions where there is normally no pressure differential or where pressure in the battery is lower than outside air pressure.

It is another object of the invention to provide a valve for valve-regulated electric storage batteries wherein the valve is free-flowing in the direction from the battery to the outside but not in the opposite direction.

These and other objects of the present invention are achieved in the preferred embodiments disclosed below by providing a valve for an electric storage battery, comprising a cap housing for being positioned in an access port in the battery, the cap housing having interior side walls defining a gas-flow orifice therethrough. A valve member is positioned in the gas-flow orifice of the cap housing, and comprises a valve body, including at least one vent defining a gas-flow passage from an upstream to a downstream side of the valve body, a resilient, radially-outwardly extending annular skirt positioned on the downstream side of the valve body in gas-flow communication with the vent, the skirt extending radially outwardly from the valve body in the downstream direction. The skirt has an outermost free end normally sealingly engaging the side walls of the cap housing defining the gas-flow orifice. The annular skirt and adjacent side walls of the cap housing define therebetween an annular recess in gas-flow communication with the vent. The recess progressively narrows in the downstream direction to a terminus at the outermost free end of the skirt. The skirt is adapted to be resiliently responsive to internal gas pressure in the recess acting on the skirt to disengage the side walls of the cap housing by radial, inward movement at a predetermined gas pressure in the battery to provide a gap between the free end of the skirt and the side walls of the cap housing for passing gas past the valve member and into the atmosphere. The skirt is also adapted to retain liquids in the battery by trapping any liquid in the gas stream against the outwardly extending skirt and return the liquid in the upstream direction to the battery through the vent in the valve body. The skirt is also adapted to return rapidly to sealing engagement with the side walls of the cap housing upon reduction of the gas pressure to a value below the predetermined maximum gas pressure.

According to one preferred embodiment of the invention, the valve body includes a pair of diametrically-spaced vents extending through the valve body adjacent the outer periphery thereof.

According to another preferred embodiment of the invention, the valve body includes a plurality of annular ridges on outer walls thereof for sealingly positioning the valve body in the gas-flow orifice of the cap housing.

According to yet another preferred embodiment of the invention, the skirt defines an annular void radially inwardly thereof.

Preferably, flame arrester means are positioned in the gas-flow orifice downstream of the skirt.

According to yet another preferred embodiment of the invention, screw threads are formed in outer walls of the cap housing for mating with complementary screw threads formed in walls of the battery defining the access port.

According to yet another preferred embodiment of the invention, a battery case is provided for containing gas-generating electrochemical means for producing an electric current. The battery case includes at least one access port. A valve is provided for an electric storage battery, and comprises a cap housing for being positioned in an access port in the battery, the cap housing having interior side walls defining a gas-flow orifice therethrough. A valve member is positioned in the gas-flow orifice of the cap housing, and comprises a valve body, including at least one vent defining a gas-flow passage from an upstream to a downstream side of the valve body, a resilient, radially-outwardly extending annular skirt positioned on the downstream side of the valve body in gas-flow communication with the vent, the skirt extending radially outwardly from the valve body in the downstream direction. The skirt has an outermost free end normally sealingly engaging the side walls of the cap housing defining the gas-flow orifice. The annular skirt and adjacent side walls of the cap housing define therebetween an annular recess in gas-flow communication with the vent. The recess progressively narrows in the downstream direction to a terminus at the outermost free end of the skirt. The skirt is adapted to be resiliently responsive to internal gas pressure in the recess acting on the skirt to disengage the side walls of the cap housing by radial, inward movement at a predetermined gas pressure in the battery to provide a gap between the free end of the skirt and the side walls of the cap housing for passing gas past the valve member and into the atmosphere. The skirt is also adapted to retain liquids in the battery by trapping any liquid in the gas stream against the outwardly extending skirt and return the liquid in the upstream direction to the battery through the vent in the valve body. The skirt is also adapted to return rapidly to sealing engagement with the side walls of the cap housing upon reduction of the gas pressure to a value below the predetermined maximum gas pressure.

According to one preferred embodiment of the invention, the battery includes a plurality of access ports positioned in spaced-apart relation along an upper surface of the battery case, each of the access ports having a positioned therein a respective valve.

According to another preferred embodiment of the invention, the valve body includes a pair of diametrically-spaced vents extending through the valve body adjacent the outer periphery thereof.

According to yet another preferred embodiment of the invention, the valve body includes a plurality of annular ridges on outer walls thereof for sealingly positioning the valve body in the gas-flow orifice of the cap housing.

According to yet another preferred embodiment of the invention, the skirt defines an annular void radially inwardly thereof.

According to yet another preferred embodiment of the invention, flame arrester means are positioned in the gas-flow orifice downstream of the skirt.

According to yet another preferred embodiment of the invention, screw threads are formed in outer walls of the cap housing for mating with complementary screw threads formed in walls of the battery defining the access port.

According to one preferred embodiment of the invention, a valve is provided for an electric storage battery, comprising a valve body for being positioned in an opening in the battery and communicating with the interior of the battery. The valve body includes at least one vent defining a gas-flow passage from an upstream to a downstream side of said valve body and a resilient, radially-outwardly extending annular skirt positioned on the downstream side of said valve body in gas-flow communication with said vent, said skirt extending outwardly from said valve body in the downstream direction. The skirt has an outermost free end normally sealingly engaging the walls of the opening. The annular skirt and adjacent side walls of said cap housing define therebetween an annular recess in gas-flow communication with said vent, said recess progressively narrowing in the downstream direction to a terminus at the outermost free end of said skirt. The skirt is adapted to be resiliently responsive to internal gas pressure in said recess acting on said skirt to disengage the side walls of said cap housing by radial, inward movement at a predetermined gas pressure in said battery to provide a gap between the free end of the skirt and the walls of the opening for passing gas past said valve body and into the atmosphere, retain liquids in said battery by trapping any liquid in the gas stream against the outwardly extending skirt and return the liquid in the upstream direction to the battery through the vent in the valve body, and return rapidly to sealing engagement with the side walls of the cap housing upon reduction of said gas pressure to a value below the predetermined maximum gas pressure.

According to another preferred embodiment of the invention, the opening in the battery includes screw threads formed in walls of the battery defining the opening and mating with complementary screw threads formed in walls of the battery defining the access port.

According to yet another preferred embodiment of the invention, an electric storage battery is provided, comprising a battery case for containing gas-generating electrochemical means for producing an electric current, said battery case containing at least one opening communicating with the interior of the battery and a valve positioned in said at least one opening, said valve comprising a valve body, including at least one vent defining a gas-flow passage from an upstream to a downstream side of said valve body. A resilient, radially-outwardly extending annular skirt is positioned on the downstream side of said valve body in gas-flow communication with said vent, said skirt extending outwardly from said valve body in the downstream direction. The skirt has an outermost free end normally sealingly engaging the side walls of the cap housing defining the opening in the battery. The annular skirt and adjacent side walls of said cap housing defining therebetween an annular recess in gas-flow communication with said vent. The recess progressively narrows in the downstream direction to a terminus at the outermost free end of said skirt. The skirt is adapted to be resiliently responsive to internal gas pressure in said recess acting on said skirt to disengage the walls of said battery opening by radial, inward movement at a predetermined gas pressure in said battery to provide a gap between the free end of the skirt and the side walls of the opening for passing gas past said valve body and into the atmosphere, retain liquids in said battery by trapping any liquid in the gas stream against the outwardly extending skirt and return the liquid in the upstream direction to the battery through the vent in the valve body, and return rapidly to sealing engagement with the side walls of the battery opening upon reduction of said gas pressure to a value below the predetermined maximum gas pressure.

According to yet another preferred embodiment of the invention, the battery includes a plurality of openings communicating with the interior of the battery and positioned in spaced-apart relation along an upper surface of said battery case, each of said openings having a positioned therein a respective valve.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
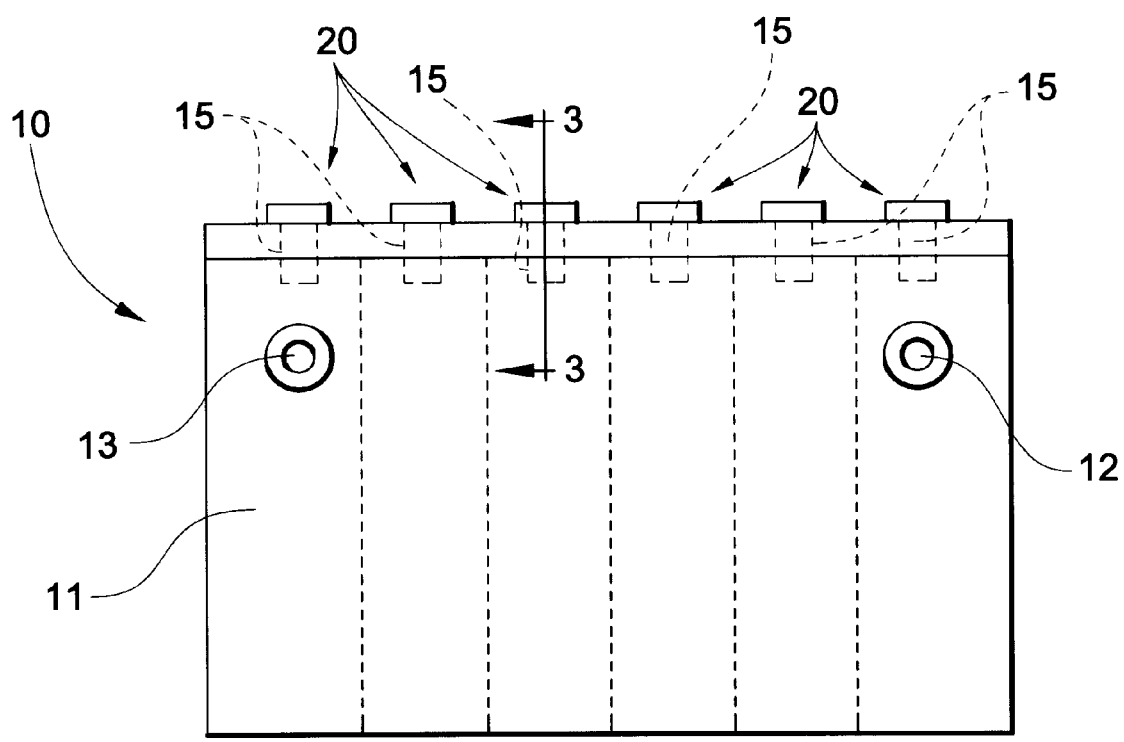
FIG. 1 is a side elevation of a battery having six valves according to an embodiment of the invention.

Referring now specifically to the drawings, an electric storage battery according to the present invention is illustrated in FIG. 1 and shown generally at reference numeral 10. Battery 10 includes a battery case 11 which includes a predetermined number, such as six, of internal current-producing cells (not shown), a pair of connection terminals 12 and 13, and six access ports 15 in its top side. These elements are conventional and are not further described.

Figure 2:
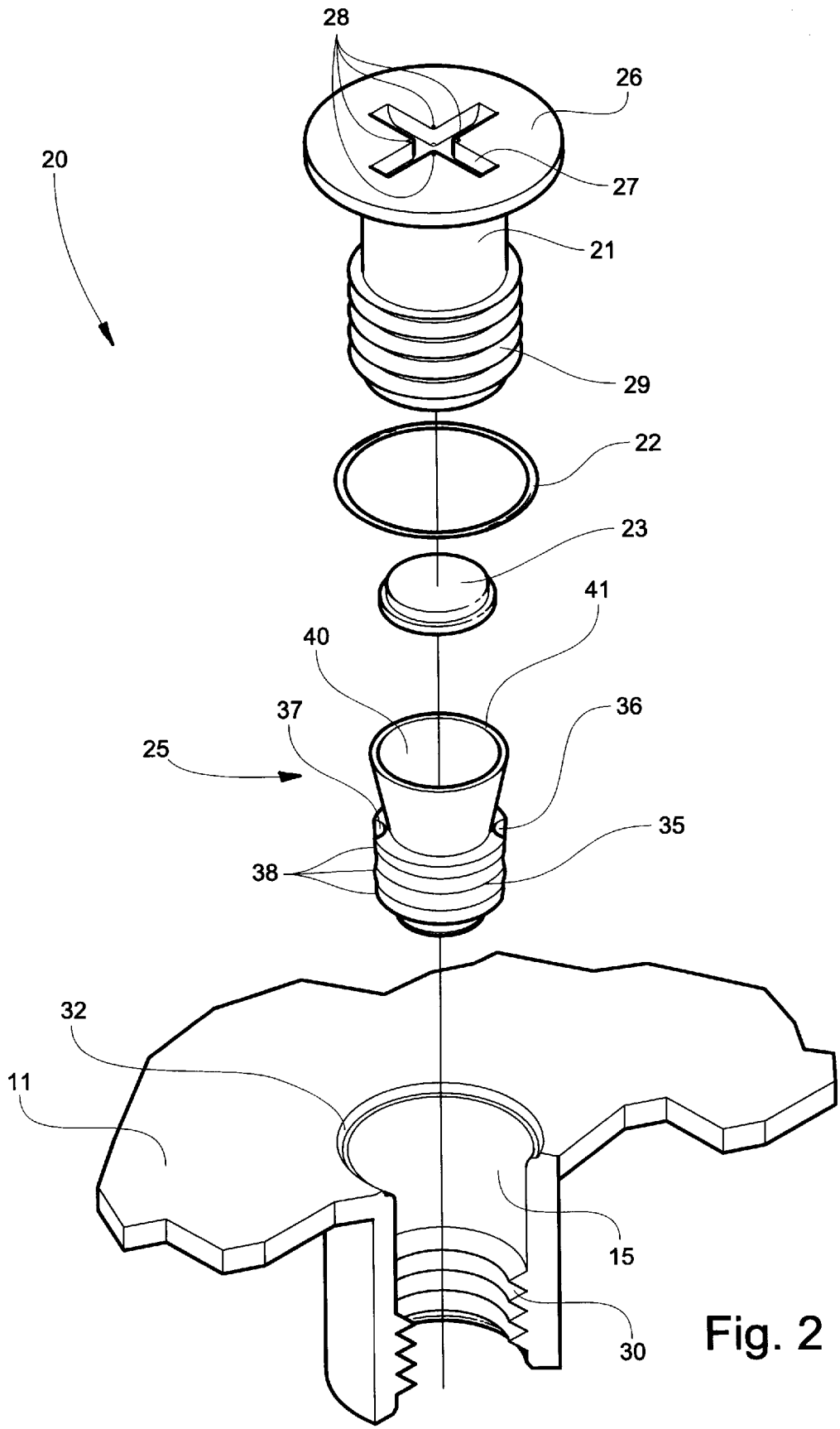
FIG. 2 is an exploded, perspective view of a valve according to an embodiment of the invention.

Positioned in each of the access ports is a valve 20 according to an embodiment of the invention. As is best shown in FIG. 2, valve 20 generally includes a cap housing 21, a sealing O-ring 22, a flame arrester 23 and a valve member 25.

Alternatively, internal intercell connections can eliminate the need for all but one of the valves 20.

Cap housing 21 includes an enlarged head 26 with screwdriver slots 27 for permitting the cap housing to be screwed into and removed from the access port 15 with the use of either a suitably-sized conventional blade or Phillips-head screwdriver. Head 26 also includes vent openings 28 which communicate with an internal gas-flow orifice 24 (see FIGS. 3–5) extending through and defined by the interior walls of the cap housing 21.

Cap housing 21 also includes screw threads 29 which mate with screw threads 30 on the walls of the access port 15.

O-ring 22 seals the cap housing to the battery case 10. An annular groove 32 surrounding access port 15 receives and supports O-ring 22, as is best shown in FIGS. 3–5.

Valve member 25 is formed of a valve body 35 which includes a pair of opposed vents 36 and 37 which extend along the lower extent of the valve body 35 and define gas-flow passages from an upstream to a downstream side of the valve body 35. A series of spaced-apart annular ridges 38 formed on the outer surface of the valve body 35 permit the valve member 25 to be inserted into and seal by means of a press fit against the inner walls of the cap housing 21.

The valve member 25 also includes a resilient, radially-outwardly extending annular skirt 40 positioned on the downstream side of the valve body 35 in gas-flow communication with vents 36 and 37. The skirt 40 flares outwardly from the valve body 35 in the downstream direction, and has an outermost, annular free end 41 normally sealingly engaging the side walls of the cap housing 21 defining the gas-flow orifice 24.

Figure 3:
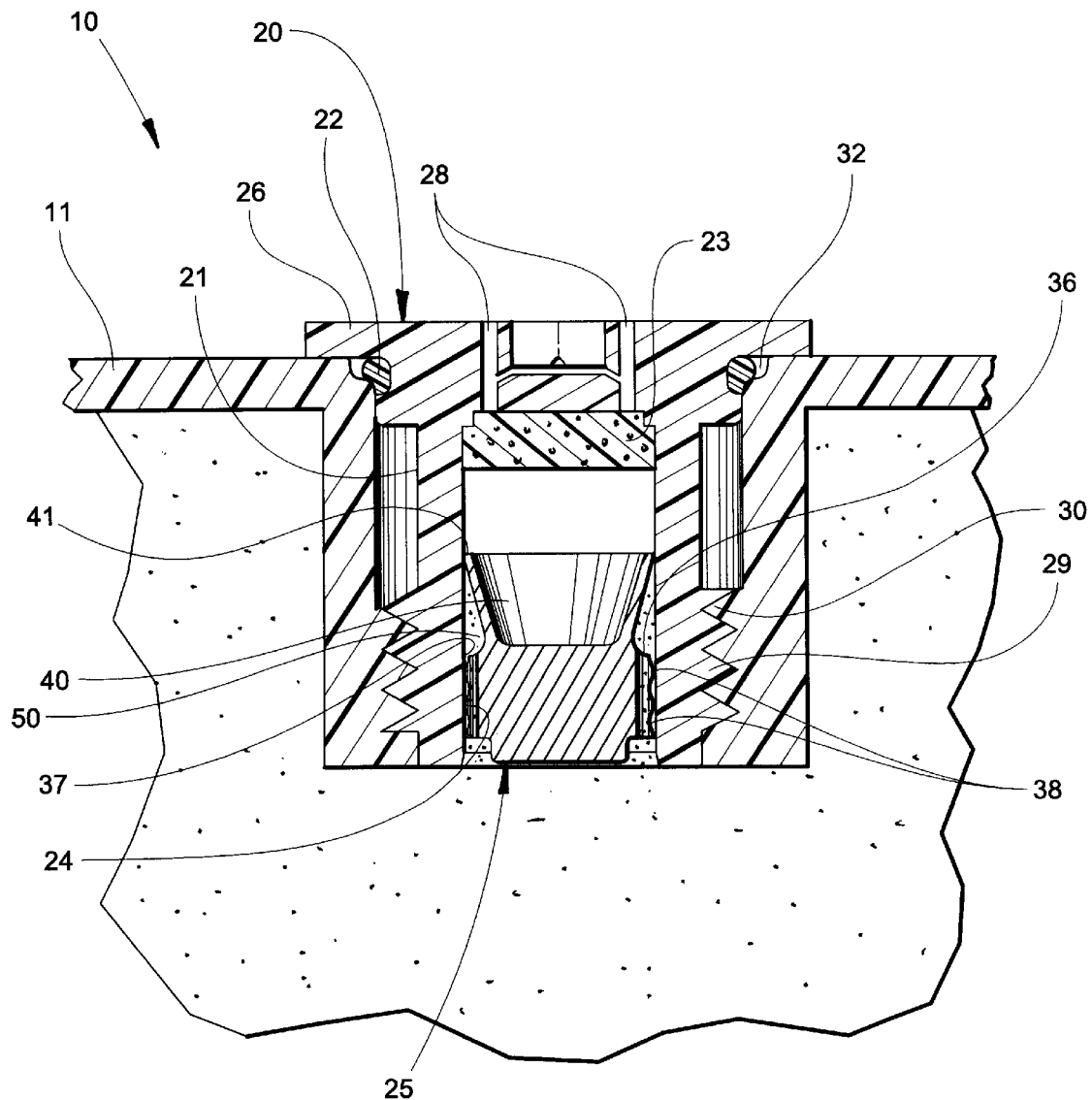
FIGS. 3, 4 and 5 are sequential views showing the ejection of gas from the valve upon an increase of pressure within the battery.
Figure 4:
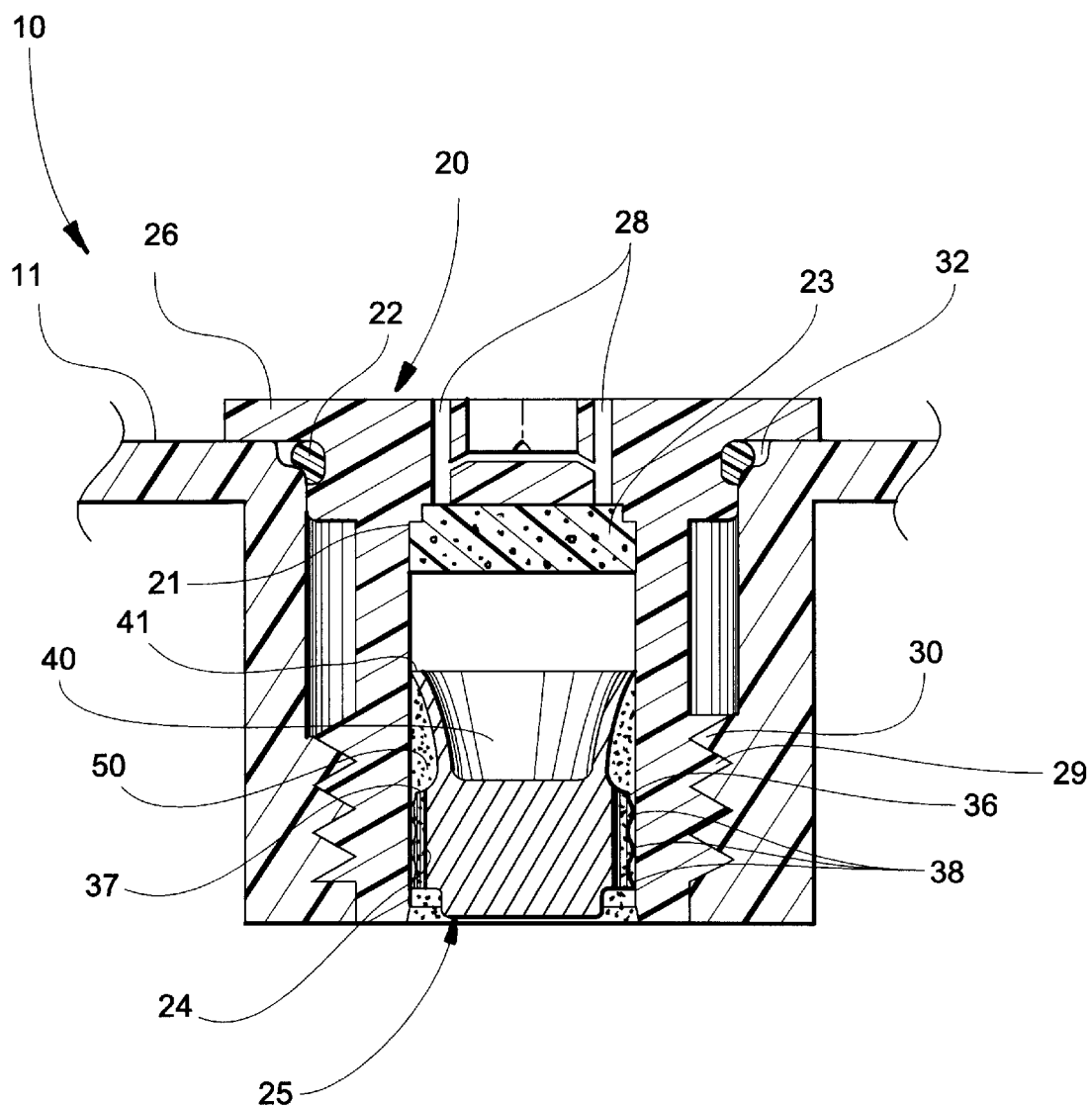
Figure 5:
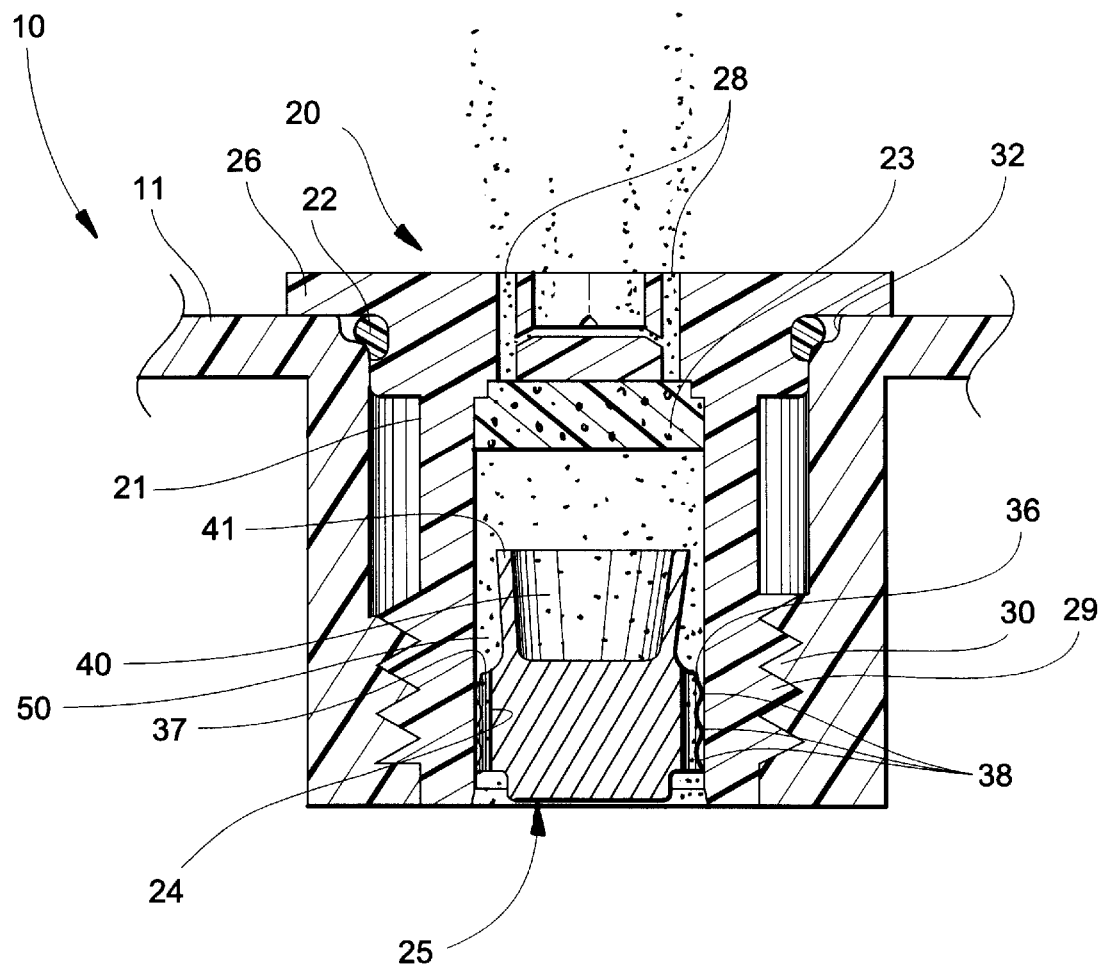

Referring now to FIGS. 3–5, the cooperation of the above-described elements and the positioning of the valve 20 in access port 15 is more fully described and illustrated.

As shown in FIGS. 3–5, when valve 20 is fully screwed into the access port 15, O-ring 22 seats against groove 32 in battery case 20 and against the underside of head 26. Thus, gas can be vented only through vent openings 28, which communicate with the gas-flow orifice 24. The flame arrester 23 is positioned against the underside of the head 26 and completely covers the vent openings 28. Thus, any spark or flame must flow through the flame arrester 23, and thus any flame or spark is extinguished before entering the battery. Flame arrester 23 is an open-cell foam material of conventional material and design.

The free end 41 of the annular skirt 40 is positioned against the inner walls of the cap housing 21 defining the gas-flow orifice 24, and normally seals against gas flow between the atmosphere and the interior of the battery. The valve member 25 may be integrally molded of ethylene propylene diamine monomer (EPDM). This material is a rubber-like material which has long-lasting flexibility and resistance to harsh chemical environments and is ideally suited for use in this application. The flexibility of the skirt 40 is such that a predetermined differential pressure between the atmosphere and the battery interior will urge the skirt 40 away from the inner walls of the cap housing 21. This occurrence can be controlled by altering the thickness, angle of flare, and taper of the skirt 40.

In a preferred embodiment, a skirt having a diameter at the free end 41 of 11.40 mm, a length of 5.5 mm, a thickness of 2.5 mm, an outward flare angle of 15 degrees and a tip radius at the free end 41 of 0.2 mm will nominally deform inwardly and release gas past the skirt at a pressure differential of <1 psi.

The valve 20 is shown in its normal, sealing condition in FIG. 3. Hydrogen gas in the battery 10 is free to pass through the vents 36 and 37 into an annular recess 50 defined by the skirt 40 and adjacent side walls of the gas-flow orifice 24. The recess 50 progressively narrows in the downstream direction to a terminus at the outermost free end 41 of the skirt 40 where it contacts the side walls of the gas-flow orifice 24. Gas flow under normal non-venting conditions is stopped at this point.

As is shown in FIG. 4, skirt 40 may deform slightly as pressure increases in the battery. A predetermined gas pressure differential will momentarily break the seal between the free end 41 of skirt 40 and the walls of the gas-flow orifice 24. As is shown in FIG. 5, gas is thus permitted to flow past the skirt 40, through the flame arrester 23 and out the vent openings 28 in the head 26. As soon as the pressure differential between the interior and exterior of the battery is no longer exceeded, the skirt 40 re-engages the walls of the gas-flow orifice 24, re-sealing the battery 10.

This shape of the recess 50 tends to block the flow of water which might otherwise be ejected from the valve 20 along with hydrogen gas. This is illustrated in FIG. 5. The flare of the skirt 40 towards the walls of the gas-flow orifice 24 will trap liquid being propelled upwardly along with the gas, and cause it to flow back down into the battery 10.

As mentioned above, alternative structures are possible, including the formation of an opening in the top of the battery into which the valve is placed. The opening may be molded or otherwise formed so that when the valve and the flame arrester are placed in the opening, the battery top is welded to the battery case, which is already filled with acid, to form a completed battery.

A valve for valve-regulated electric storage batteries is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A valve for an electric storage battery, comprising:
   (a) a cap housing for being positioned in an access port in said battery;
   (b) said cap housing having interior side walls defining a gas-flow orifice therethrough;
   (c) a valve member positioned in the gas-flow orifice of the cap housing, said valve member comprising:
      (1) a valve body, including at least one vent defining a gas-flow passage from an upstream to a downstream side of said valve body;

(2) a resilient, radially-outwardly extending annular skirt positioned on the downstream side of said valve body in gas-flow communication with said vent, said skirt extending outwardly from said valve body in the downstream direction, said skirt having an outermost free end normally sealingly engaging the side walls of the cap housing defining the gas-flow orifice;

(3) said annular skirt and adjacent side walls of said cap housing defining therebetween an annular recess in gas-flow communication with said vent, said recess progressively narrowing in the downstream direction to a terminus at the outermost free end of said skirt;

(4) said skirt adapted to be resiliently responsive to internal gas pressure in said recess acting on said skirt to:

(a) disengage the side walls of said cap housing by radial, inward movement at a maximum gas pressure in said battery to provide a gap between the free end of the skirt and the side walls of the cap housing for passing gas past said valve member and into the atmosphere;

(b) retain liquids in said battery by trapping any liquid in the gas stream against the outwardly extending skirt and return the liquid in the upstream direction to the battery through the vent in the valve body; and (c) return rapidly to sealing engagement with the side walls of the cap housing upon reduction of said gas pressure to a value below the maximum gas pressure.

2. A valve according to claim 1, wherein said valve body includes a pair of diametrically-spaced vents extending through the valve body adjacent the outer periphery thereof.

3. A valve according to claim 1, wherein said valve body includes a plurality of annular ridges on outer walls thereof for sealingly positioning said valve body in the gas-flow orifice of the cap housing.

4. A valve according to claim 1, wherein said skirt defines an annular void radially inwardly thereof.

5. A valve according to claim 1, including flame arrester means positioned in said gas-flow orifice downstream of said skirt.

6. A valve according to claim 1, including screw threads formed in outer walls of said cap housing for mating with complementary screw threads formed in walls of the battery defining the access port.

7. An electric storage battery, comprising:

(a) a battery case for containing gas-generating electrochemical means for producing an electric current, said battery case containing at least one access port;

(b) a valve positioned in said at least one access port, said valve comprising:

(1) a cap housing for being positioned in an access port in said battery;

(2) said cap housing having interior side walls defining a gas-flow orifice therethrough;

(3) a valve member positioned in the orifice of the cap housing, said valve member comprising:

(a) a valve body, including at least one vent defining a gas-flow passage from an upstream to a downstream side of said valve body;

(b) a resilient, radially-outwardly extending annular skirt positioned on the downstream side of said valve body in gas-flow communication with said vent, said skirt extending outwardly from said valve body in the downstream direction, said skirt having an outermost free end normally sealingly engaging the side walls of the cap housing defining the gas-flow orifice;

(c) said annular skirt and adjacent side walls of said cap housing defining therebetween an annular recess in gas-flow communication with said vent, said recess progressively narrowing in the downstream direction to a terminus at the outermost free end of said skirt;

(d) said skirt adapted to be resiliently responsive to internal gas pressure in said recess acting on said skirt to:

(1) disengage the side walls of said cap housing by radial, inward movement at a maximum gas pressure in said battery to provide a gap between the free end of the skirt and the side walls of the cap housing for passing gas past said valve member and into the atmosphere;

(2) retain liquids in said battery by trapping any liquid in the gas stream against the outwardly extending skirt and return the liquid in the upstream direction to the battery through the vent in the valve body; and (3) return rapidly to sealing engagement with the side walls of the cap housing upon reduction of said gas pressure to a value below the maximum gas pressure.

8. An electric storage battery according to claim 7, and including a plurality of access ports positioned in spaced-apart relation along an upper surface of said battery case, each of said access ports having a positioned therein a respective valve.

9. An electric storage battery according to claim 7, wherein said valve body includes a pair of diametrically-spaced vents extending through the valve body adjacent the outer periphery thereof.

10. An electric storage battery according to claim 7, wherein said valve body a plurality of annular ridges on outer walls thereof for sealingly positioning said valve body in the gas-flow orifice of the cap housing.

11. An electric storage battery according to claim 7, wherein said skirt defines an annular void radially inwardly thereof.

12. An electric storage battery according to claim 7, including flame arrester means positioned in said gas-flow orifice downstream of said skirt.

13. An electric storage battery according to claim 7, including screw threads formed in outer walls of said cap housing for mating with complementary screw threads formed in walls of the battery defining the access port.

14. A valve for an electric storage battery, comprising:

(a) a valve body for being positioned in an opening in the battery and communicating with the interior of the battery, said valve body comprising:

(1) at least one vent defining a gas-flow passage from an upstream to a downstream side of said valve body;

(2) a resilient, radially-outwardly extending annular skirt positioned on the downstream side of said valve body in gas-flow communication with said vent, said skirt extending outwardly from said valve body in the downstream direction, said skirt having an outermost free end normally sealingly engaging walls of the opening in the battery, (3) said annular skirt and adjacent side walls of said opening defining therebetween an annular recess in gas-flow communication with said vent, said recess progressively narrowing in the downstream direction to a terminus at the outermost free end of said skirt;

(4) said skirt adapted to be resiliently responsive to internal gas pressure in said recess acting on said skirt to:
(a) disengage the walls of the opening by radial, inward movement at a maximum gas pressure in said battery to provide a gap between the free end of the skirt and the walls of the opening for passing gas past said valve body and into the atmosphere;
(b) retain liquids in said battery by trapping any liquid in the gas stream against the outwardly extending skirt and return the liquid in the upstream direction to the battery through the vent in the valve body; and
(c) return rapidly to sealing engagement with the side walls of the cap housing upon reduction of said gas pressure to a value below the maximum gas pressure.

15. A valve according to claim 14, wherein said valve body includes a pair of diametrically-spaced vents extending through the valve body adjacent the outer periphery thereof.

16. A valve according to claim 14, wherein said skirt defines an annular void radially inwardly thereof.

17. A valve according to claim 14, including flame arrester means positioned in the opening of the battery downstream of said skirt.

18. A valve according to claim 14, including screw threads formed in walls of the battery defining the opening and mating with complementary screw threads formed in walls of the battery defining the access port.

19. An electric storage battery, comprising:
(a) a battery case for containing gas-generating electrochemical means for producing an electric current, said battery case containing at least one opening communicating with the interior of the battery;
(b) a valve positioned in said at least one opening, said valve comprising:
(1) a valve body positioned in the opening, said valve body comprising:
(a) at least one vent defining a gas-flow passage from an upstream to a downstream side of said valve body;
(b) a resilient, radially-outwardly extending annular skirt positioned on the downstream side of said valve body in gas-flow communication with said vent, said skirt extending outwardly from said valve body in the downstream direction, said skirt having an outermost free end normally sealingly engaging the walls defining the opening in the battery;
(c) said annular skirt and adjacent walls of said opening defining therebetween an annular recess in gas-flow communication with said vent, said recess progressively narrowing in the downstream direction to a terminus at the outermost free end of said skirt;
(d) said skirt adapted to be resiliently responsive to internal gas pressure in said recess acting on said skirt to:
(1) disengage the walls of said battery opening by radial, inward movement at a maximum gas pressure in said battery to provide a gap between the free end of the skirt and the walls of the opening for passing gas past said valve body and into the atmosphere;
(2) retain liquids in said battery by trapping any liquid in the gas stream against the outwardly extending skirt and return the liquid in the upstream direction to the battery through the vent in the valve body; and
(3) return rapidly to sealing engagement with the side walls of the battery opening upon reduction of said gas pressure to a value below the maximum gas pressure.

20. An electric storage battery according to claim 19, and including a plurality of openings communicating with the interior of the battery and positioned in spaced-apart relation along an upper surface of said battery case, each of said openings having a positioned therein a respective valve.

21. An electric storage battery according to claim 19, wherein said valve body includes a pair of diametrically-spaced vents extending through the valve body adjacent the outer periphery thereof.

22. An electric storage battery according to claim 19, wherein said valve body a plurality of annular ridges on outer walls thereof for sealingly positioning said valve body in the opening in the battery.

23. An electric storage battery according to claim 19, wherein said skirt defines an annular void radially inwardly thereof.

* * * * *